US012766842B2

(12) United States Patent
Hamade

(10) Patent No.: US 12,766,842 B2
(45) Date of Patent: Oct. 20, 2026

(54) LIQUID DISCHARGE APPARATUS AND METHOD FOR CLEANING DISCHARGE PORT FACE OF THE SAME

(71) Applicant: CANON KABUSHIKI KAISHA, Tokyo (JP)

(72) Inventor: Yohei Hamade, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 18/793,592

(22) Filed: Aug. 2, 2024

(65) Prior Publication Data

US 2025/0050642 A1 Feb. 13, 2025

(30) Foreign Application Priority Data

Aug. 9, 2023 (JP) ................................ 2023-130033
May 22, 2024 (JP) ................................ 2024-083430

(51) Int. Cl.
*B41J 2/165* (2006.01)

(52) U.S. Cl.
CPC ....... *B41J 2/16535* (2013.01); *B41J 2/16538* (2013.01); *B41J 2/16544* (2013.01); *B41J 2002/16558* (2013.01); *B41J 2002/1657* (2013.01); *B41J 2002/16573* (2013.01)

(58) Field of Classification Search
CPC ........................ B41J 2/16535; B41J 2/16538; B41J 2/16544; B41J 2002/16558; B41J 2002/1657; B41J 2002/16573; B41J 2/16552
See application file for complete search history.

(56) References Cited

FOREIGN PATENT DOCUMENTS

| | | | | | |
|---|---|---|---|---|---|
| CN | 108454242 B | * | 9/2020 | ............ | B41J 25/003 |
| JP | 2017159118 A | | 9/2017 | | |

* cited by examiner

*Primary Examiner* — Justin Seo
(74) *Attorney, Agent, or Firm* — Canon U.S.A., Inc., IP Division

(57) ABSTRACT

A liquid discharge apparatus includes a substrate having a discharge port face provided with a discharge port for discharging a liquid, a member having a recessed portion for storing the substrate, a sealing material for sealing a gap between the recessed portion of the member and the substrate, a wiping member configured to wipe the discharge port face, and an application member configured to apply oil to the sealing material.

18 Claims, 8 Drawing Sheets

LIQUID DISCHARGE APPARATUS AND METHOD FOR CLEANING DISCHARGE PORT FACE OF THE SAME

BACKGROUND

Field

The present disclosure relates to a liquid discharge apparatus, and a method for cleaning a discharge port face of the liquid discharge apparatus.

Description of the Related Art

An ink-jet recording apparatus, a type of a liquid discharge apparatus, records images and texts on a recording medium by discharging a liquid from substrates having a discharge port face provided with a discharge port for discharging a liquid. If ink coagulations, dirt in the apparatus, dusts, or paper dusts from a recording medium adhere to the ink discharge port face, defective printing may possibly occur. Therefore, conventional ink-jet recording apparatuses use a cleaning method for wiping the discharge port face to wipe out adhering substances by using a wiping member during non-print time. During this cleaning, members around the ink discharge port face that may be subject to ink adhesion are generally wiped at the same time. However, members susceptible to scraping may possibly generate dirt due to abrasion. In particular, an ink-jet recording apparatus is provided with a member having a recessed portion for storing the substrate. The surface of a sealing material for sealing the gap between the recessed portion and the substrate is likely to be inclined by the difference in wettability from peripheral members in contact and the hardening and shrinkage of the sealing material itself. Therefore, if the wiping member ununiformly comes into contact with the sealing material, the wiping member scrapes the sealing material by the abrasion, possibly generating dirt.

Japanese Patent Application Laid-Open No. 2014-159118 discloses a method for restricting the abrasion of a sealing material by reducing the friction between a wiping member and a sealing material. With this method, the wiping member is soaked with a silicone oil component, and the bled out oil component is applied from the wiping member to the sealing material.

With this method, however, silicone oil may adhere to the discharge port face while the discharge port face is being wiped. This is because the wiping member for wiping the discharge port face and the oil application member soaked with silicone oil are the same member. As a result, a liquid is not normally discharged, possibly resulting in defective printing.

SUMMARY OF THE INVENTION

In view of the above-described issue, the present disclosure is directed to providing a liquid discharge apparatus for preventing defective printing while reducing the abrasion of a sealing material by a wiping member, and a method for cleaning a discharge port face of the liquid discharge apparatus.

According to an aspect of the present disclosure, a liquid discharge apparatus includes a substrate having a discharge port face provided with a discharge port for discharging a liquid, a member having a recessed portion for storing the substrate, a sealing material for sealing a gap between the recessed portion of the member and the substrate, a wiping member configured to wipe the discharge port face, and an application member configured to apply oil to the sealing material.

Further features of the present disclosure will become apparent from the following description of exemplary embodiments with reference to the attached drawings.

DESCRIPTION OF THE EMBODIMENTS

Figure 1:
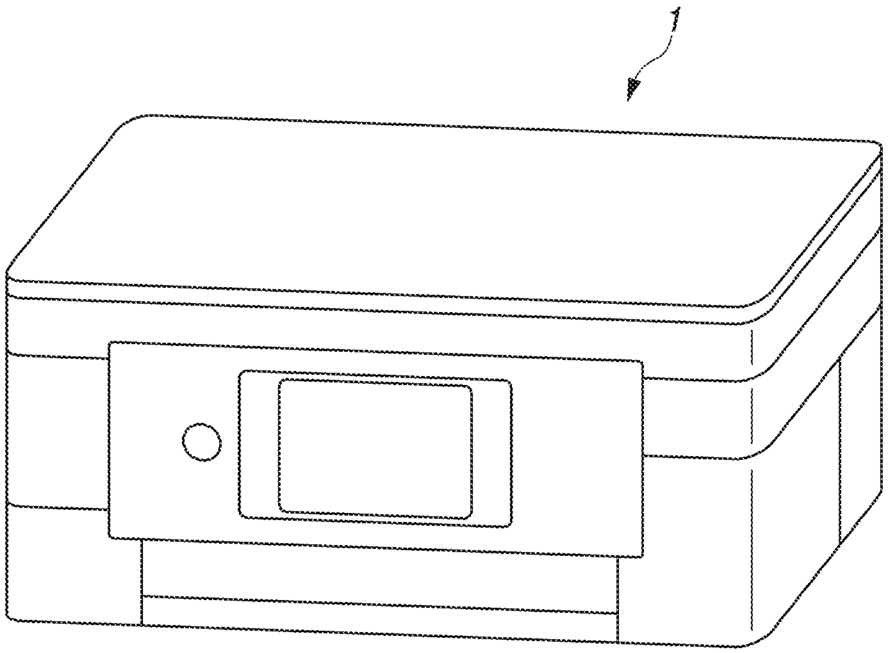
FIG. 1 is a perspective view illustrating a liquid discharge apparatus.

Exemplary embodiments of the present disclosure will be described below with reference to the accompanying drawings. The following exemplary embodiments do not limit the present disclosure. Not all of the combinations of the features described in the exemplary embodiments are indispensable to the solutions for the present disclosure. In the following drawings, identical components are assigned the same reference numerals.

According to the present disclosure, unless otherwise specified, a numerical range description or a description "XX to YY" means a numerical range including end points, i.e., upper and lower limits. If a numerical range is described in a stepwise way, the upper and lower limits of each numerical range can be optionally combined.

(Liquid Discharge Apparatus)

FIG. 1 illustrates a liquid discharge apparatus according to a first exemplary embodiment. The liquid discharge apparatus according to the present exemplary embodiment is an ink-jet recording apparatus for recording images and texts by discharging ink onto a recording medium. The liquid discharge apparatus according to the present exemplary embodiment includes a liquid discharge head 3 (see FIG. 2A) including substrates 2 (see FIG. 2B) having a discharge port face 13 (see FIG. 2A) provided with a discharge port for discharging a liquid, and a member 12 (see FIG. 2C) having a recessed portion 14 (see FIG. 2C) storing a substrate. The liquid discharge head 3 is mounted on a carriage 5 (see FIG. 4). The liquid discharge apparatus has a sealing material 8 (see FIG. 2B) for sealing between the recessed portion 14 of the member 12 and a substrate 2. The liquid discharge apparatus includes a wiping member 21 (see FIG. 5) for wiping the discharge port face 13, and an application member 22 (see FIG. 4) for applying oil to the sealing material 8 in addition to the wiping member 21. By employing separate members for the application member 22 for applying oil to reduce the abrasion of the sealing material 8 and the wiping member 21 for wiping the discharge port face 13, it becomes possible to prevent oil from being supplied to the discharge port face 13, i.e., defective printing while reducing the abrasion of the sealing material 8. The liquid discharge apparatus according to the present disclosure will be described in detail below.

(Liquid Discharge Head)

Figure 2A:
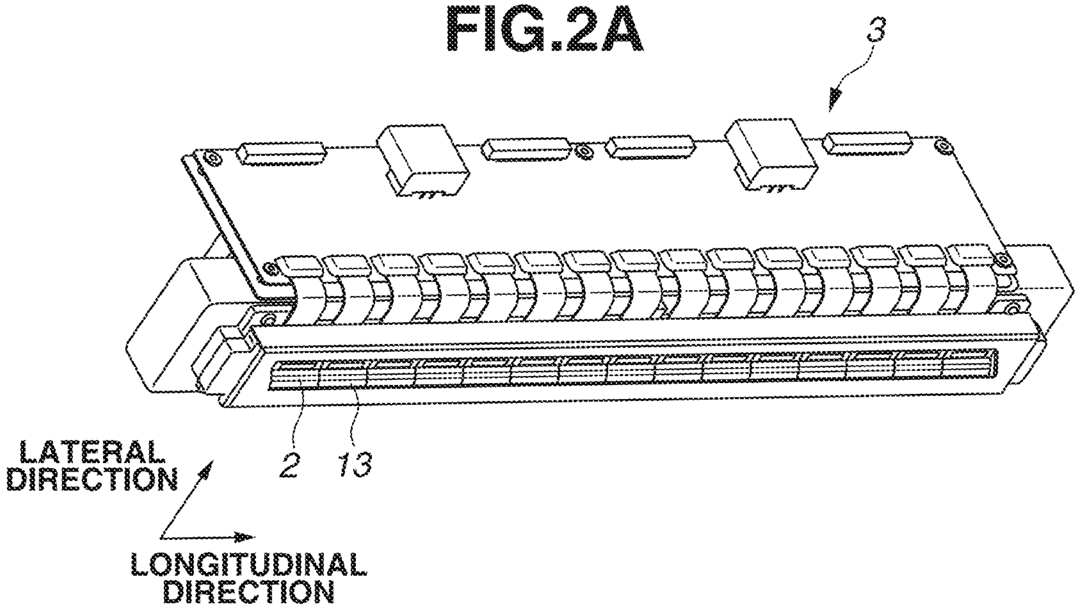
FIG. 2A is a perspective view illustrating a liquid discharge head.

Firstly, the liquid discharge head 3 according to the present disclosure will be described below. FIG. 2A is a perspective view illustrating the liquid discharge head 3 according to the present disclosure. The liquid discharge head 3 according to the present disclosure is an ink-jet print head for recording images and texts by discharging ink onto a recording medium. The liquid discharge head 3 includes the substrates 2 having the discharge port face 13. FIG. 2A illustrates a full-line head including a plurality of the substrates 2 arranged in a row. The full-line head discharges a liquid in a row onto a conveyed recording medium to record images and texts without the liquid discharge head 3 performing a scanning operation. The liquid discharge head 3 according to the present disclosure may be a serial scan head for discharging a liquid onto a conveyed recording medium while the liquid discharge head 3 performs a scanning operation.

Figure 2B:
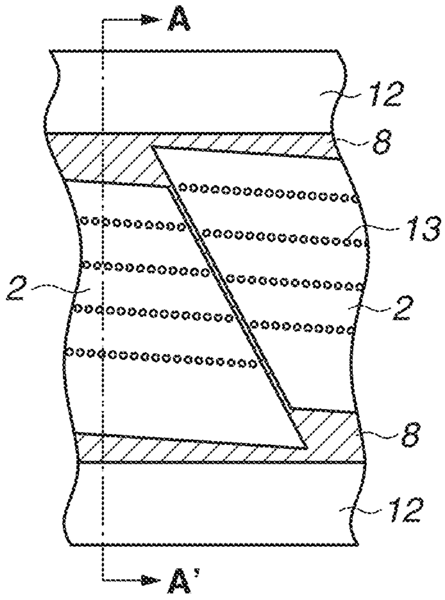
FIG. 2B is a partial enlarged view illustrating the liquid discharge head.
Figure 2C:
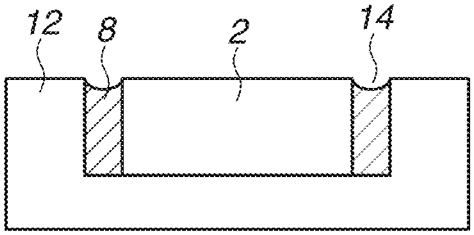
FIG. 2C is a cross-sectional view taken along the A-A line of FIG. 2B.

FIG. 2B is a partial enlarged view illustrating the liquid discharge head 3 viewed from the discharge port face 13, and FIG. 2C is a cross-sectional view taken along the A-A line of FIG. 2B. The liquid discharge head 3 includes the members 12 provided with a recessed portion for storing the substrate 2. There is provided a sealing material 8 between the substrate 2 and the member 12. The sealing material 8 is intended to seal the gap between the walls of the recessed portion of the member 12 and the substrate 2. The substrate 2 includes a discharge port face 13 for discharging a liquid, an energy generation element (not illustrated) for generating energy for discharging a liquid, and an electronic circuit element (not illustrated) for controlling the energy generation element.

(Cleaning Method)

As described above, the substrate 2 includes the discharge port face 13 for discharging a liquid. Ink coagulations, dirt in the liquid discharge apparatus, dust, or paper dust from a recording medium may adhere to the discharge port face 13. Cleaning the discharge port face 13 is effective to remove these substances.

Figure 3:
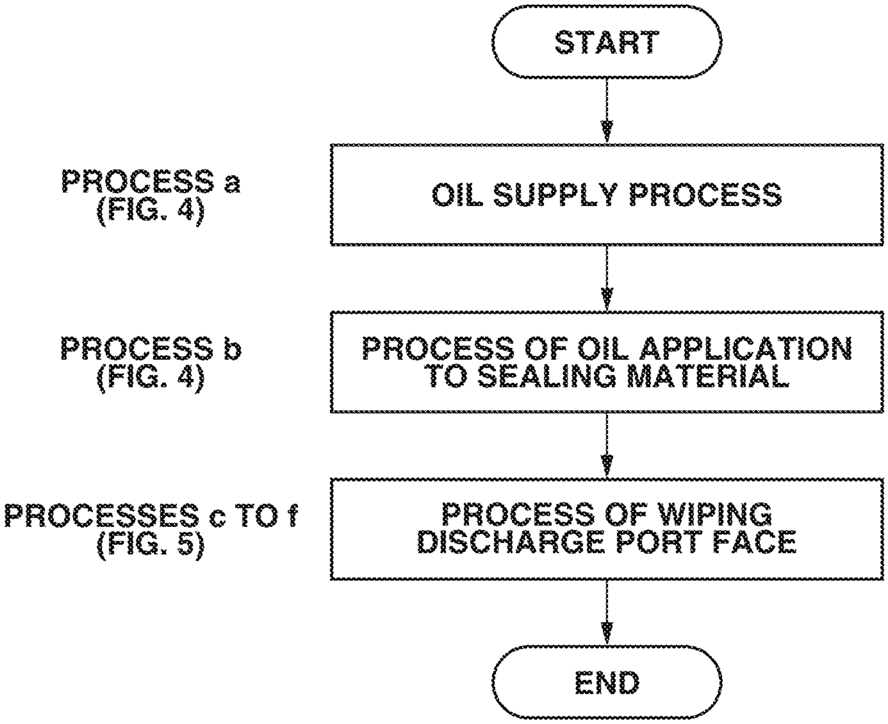
FIG. 3 is a flowchart illustrating a method for cleaning a discharge port face.
Figure 4:
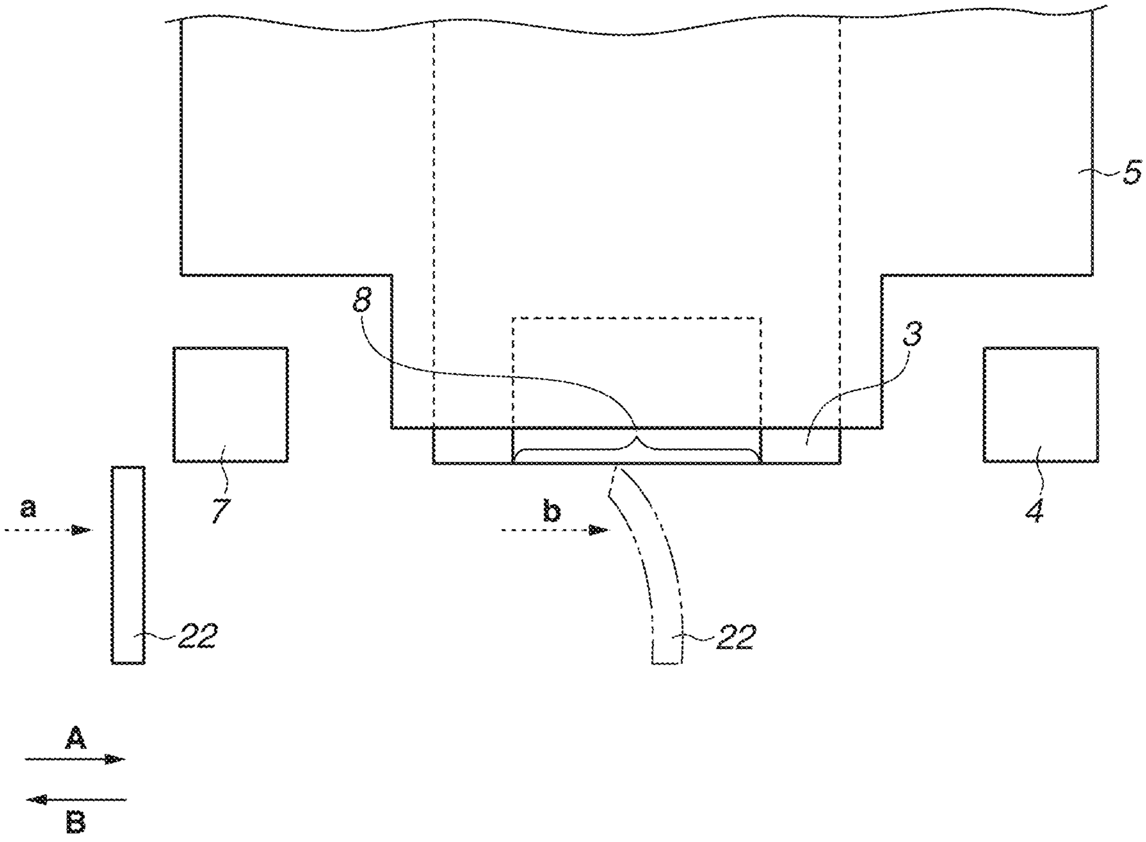
FIG. 4 is a schematic view illustrating a process of applying oil from an application member to a sealing material.
Figure 5:
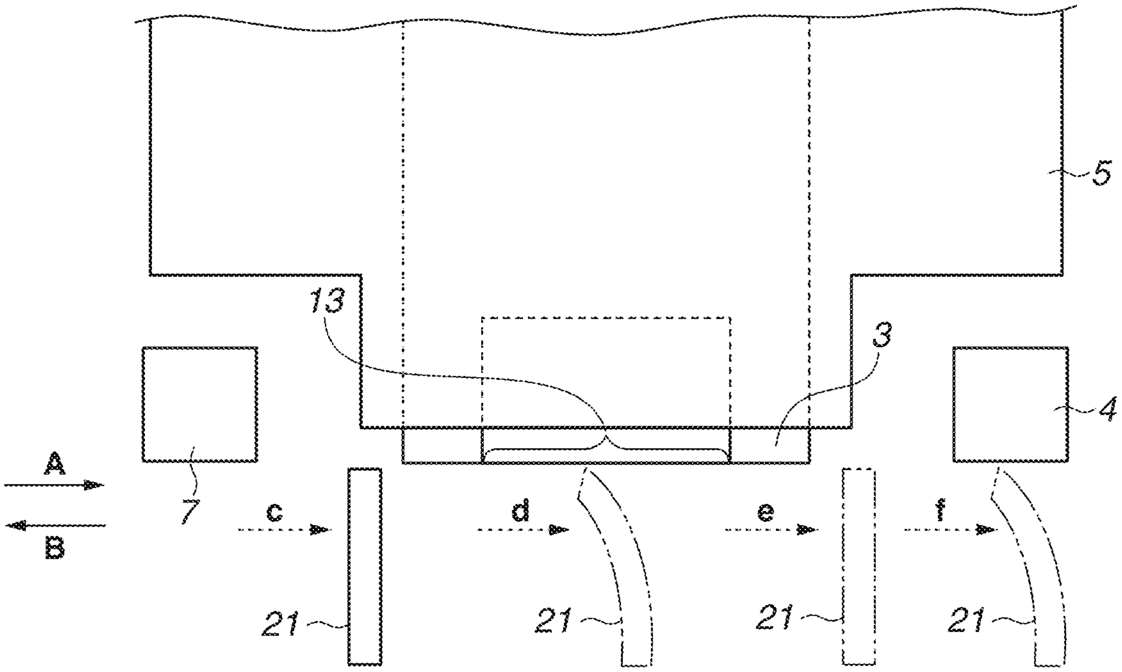
FIG. 5 is a schematic view illustrating a process where a wiping member wipes the discharge port face.

A cleaning method according to the present exemplary embodiment will be described below. FIG. 3 is a flowchart illustrating the cleaning method according to the present exemplary embodiment. FIG. 4 is a schematic view illustrating a process of applying oil to the sealing material 8. FIG. 5 is a schematic view illustrating a process of wiping the discharge port face 13. FIGS. 4 and 5 illustrate the liquid discharge head 3 viewed from the longitudinal direction.

The liquid discharge apparatus according to the present exemplary embodiment includes the application member 22 for applying oil to the sealing material 8, a first oil supply unit 7 for supplying oil to the application member 22, and an oil storage unit (not illustrated) for storing oil. Firstly, the application member 22 is moved in the A direction in FIG. 4 by a drive source (not illustrated), and oil is supplied from the first oil supply unit 7 to the application member 22 (first supply process or process a). During cleaning, since the application member 22 is applied with oil from the first oil supply unit 7, the application member 22 can be suitably applied with oil even when the application member 22 runs out of oil. In the liquid discharge apparatus according to the present disclosure, the application member 22 may be initially soaked with oil and may include neither the first oil supply unit 7 nor the oil storage unit (not illustrated). The first oil supply unit 7 and the oil storage unit may be integrated as one unit. Alternatively, the first oil supply unit 7 and the oil storage unit may be connected via a tube so that oil is supplied from the oil storage unit to the oil supply unit 7.

Figure 6A:
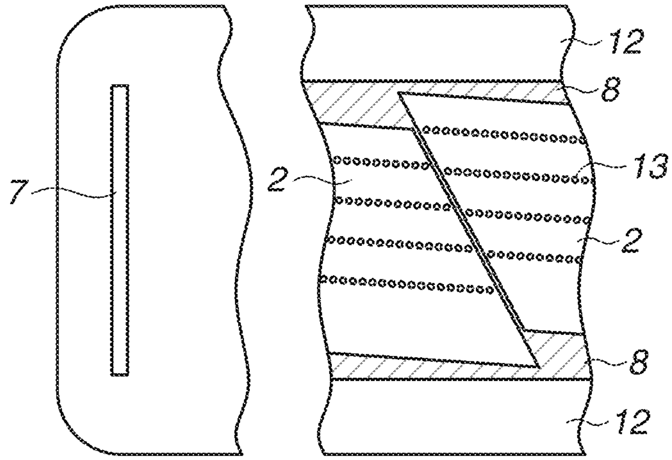
FIG. 6A is an enlarged view illustrating a first oil supply unit.
Figure 6B:
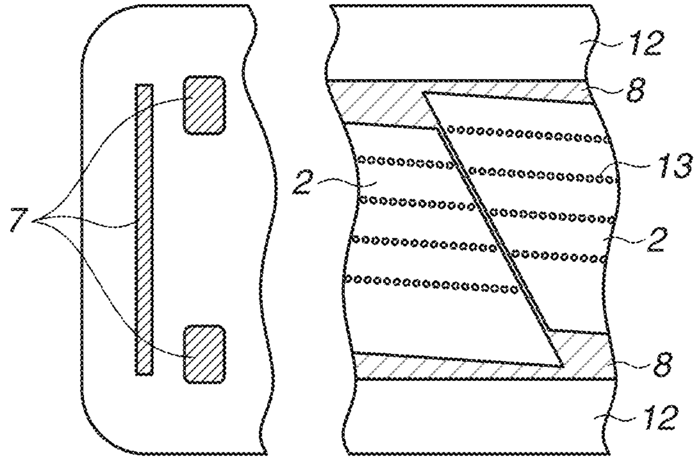
FIG. 6B is another enlarged view illustrating the first oil supply unit.
Figure 6C:
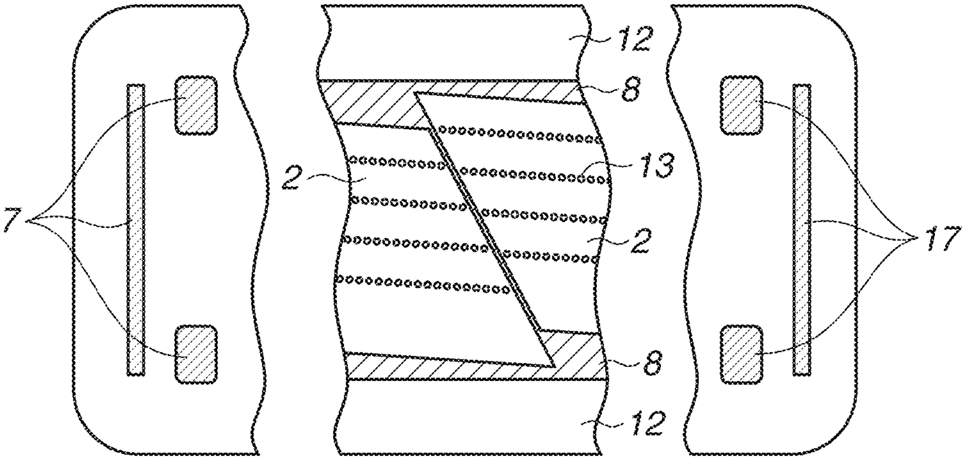
FIG. 6C is an enlarged view illustrating the first oil supply unit and a second oil supply unit.

The first oil supply unit 7 may be disposed on the liquid discharge head 3. FIGS. 6A to 6C are schematic views illustrating the liquid discharge head 3 provided with the first oil supply unit 7, viewed from the discharge port face 13. As illustrated in FIG. 6A, advantageously the first oil supply unit 7 is disposed at an edge of the liquid discharge head 3 in the arrangement direction of the plurality of the substrates 2 (longitudinal edge of the liquid discharge head 3). This configuration allows oil to be supplied from the first oil supply unit 7 to the application member 22 and from the application member 22 to the sealing material 8 at short distances, enabling efficient oil delivery without spoiling oil. The configuration eliminates the need of providing the first oil supply unit 7 outside the liquid discharge head 3, achieving the downsizing of the liquid discharge apparatus.

Figure 7:
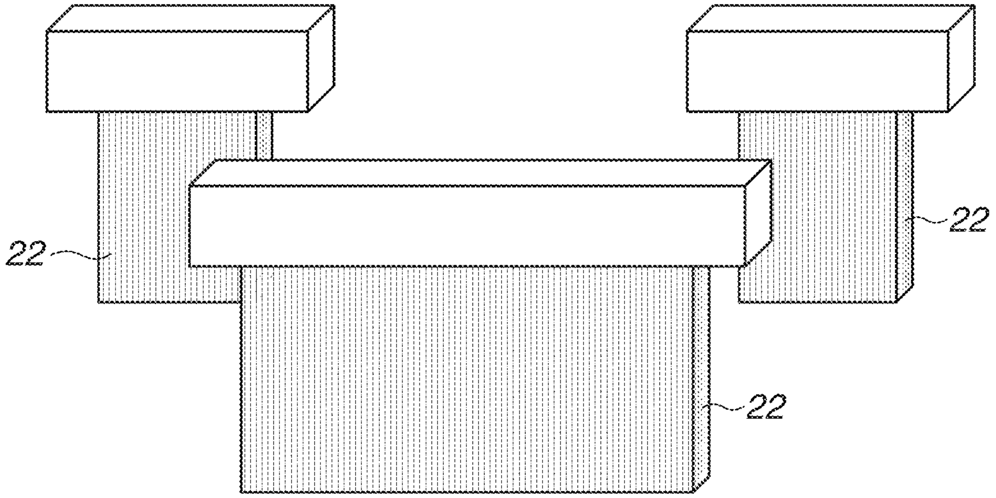
FIG. 7 is a schematic view illustrating a wiping member configured not to come into contact with the discharge port face.

Then, when the application member 22 further moves in the direction of the arrow A, and the application member 22 and the sealing material 8 come into contact with each other, oil is supplied from the application member 22 to the sealing material 8 (first application process or process b). In this process, advantageously, the application member 22 does not apply oil to the discharge port face 13. This enables preventing defective printing caused by oil adhering to the discharge port face 13. Therefore, advantageously, the application member 22 is configured to come into contact only with the sealing material 8 around the substrate 2 as illustrated in FIG. 7 and not to come into contact with the discharge port face 13. In this case, advantageously, the first oil supply unit 7 is disposed in accordance with the shape of the application member 22, as illustrated in FIG. 6B. The wiping member 21 and the application member 22 will be described in detail below.

Figure 8:
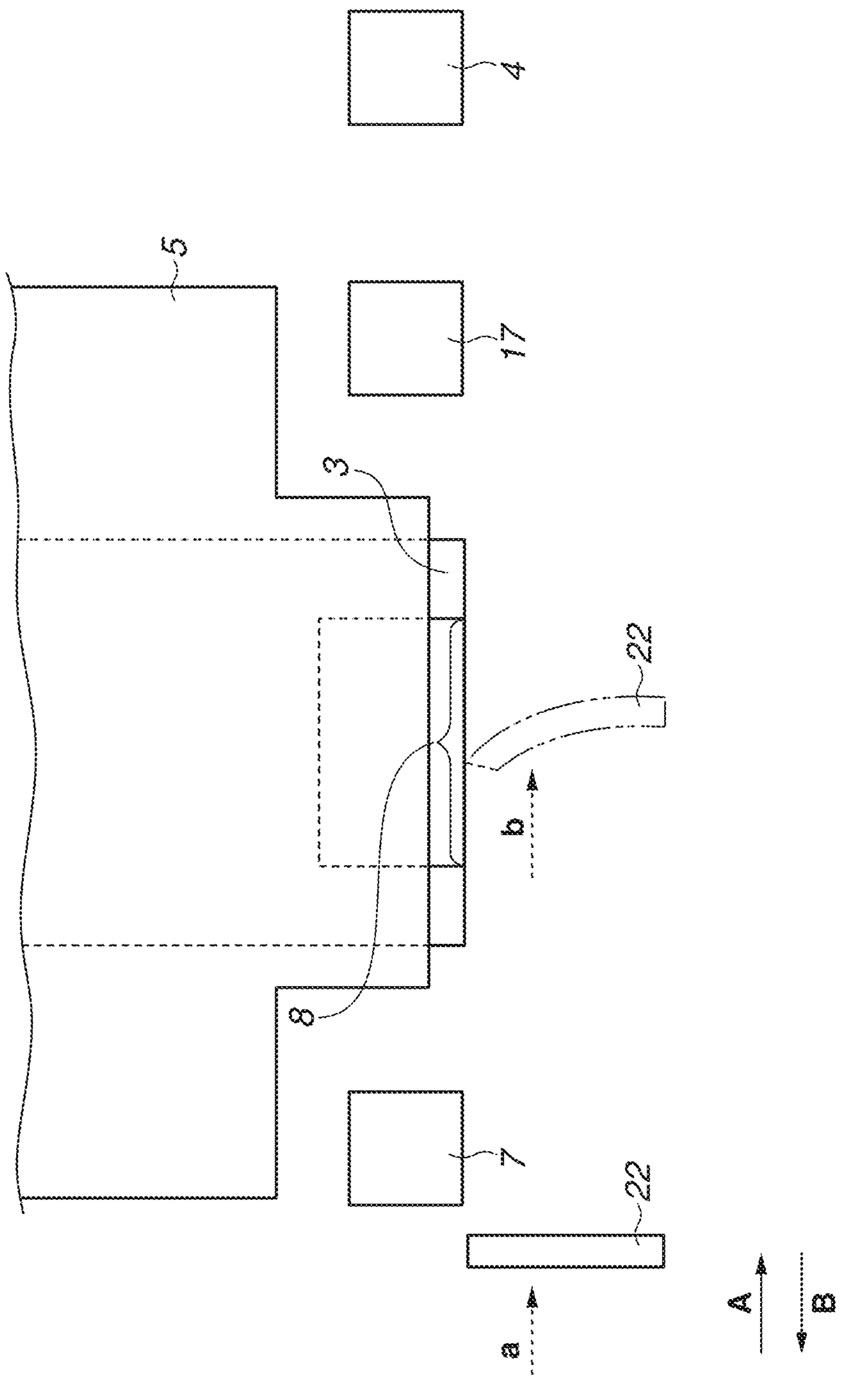
FIG. 8 is a schematic view illustrating a liquid discharge apparatus having the first and the second oil supply units.

Preferably, in addition to the first oil supply unit 7, the liquid discharge apparatus 1 includes a second oil supply unit 17 for supplying oil to the application members 22 after the first application process, as illustrated in FIG. 8. Advantageously, the first oil supply unit 7 and the second oil supply unit 17 are provided at both edges of the liquid discharge head 3 in the arrangement direction of the plurality of the substrates 2, as illustrated in FIG. 6C. Thus, even a liquid discharge head having the plurality of the substrates 2 arranged in a row can supply oil to the application member 22 at the other edge after the application member 22 moves from one edge (the side of the first oil supply unit 7) to the other edge (the side of the second oil supply unit 17) (second supply process). Further, advantageously, the liquid discharge apparatus 1 has a second application process after the second supply process. In the second application process, the application member 22 applies oil to the sealing material 8 when the application member 22 moves in the B direction. More specifically, if the application member 22 runs out of oil at the end of the process for applying oil to the sealing material 8 while moving in the A direction, oil is also supplied to the application member 22 at the other edge. Therefore, advantageously, the application member 22 can apply oil to the sealing material 8 while moving in the B direction (second application process). This enables applying a sufficient amount of oil to the entire sealing material 8. This configuration prevents the application member 22 from running out of oil, making it possible to reduce the abrasion of the sealing material 8 due to the oil runout of the application member 22 when moving from the other edge to one edge (B direction).

A process of cleaning the discharge port face 13 by using the wiping member 21 will be described below. As illustrated in FIG. 5, the wiping member 21 is moved in the direction of the arrow A by a drive source (not illustrated). At this timing, the wiping member 21 wipes the discharge port face 13 to remove dirt such as ink coagulations adhering to the discharge port face 13 (process d). In this case, even when the wiping member 21 comes into contact with the sealing material 8, the sealing material 8 is applied with oil. This reduces the friction between the wiping member 21 and the sealing material 8, thus reducing the possibility of the abrasion of the sealing material 8. More specifically, it is desirable that the liquid discharge apparatus 1 includes a control unit (not illustrated) for controlling the wiping member 21 to wipe the discharge port face 13 in a state where oil is retained by the sealing material 8. Further, even when the discharge port face 13 is applied with oil from the application member 22 in the first or the second application process, the wiping member 21 not retaining oil can wipe the discharge port face 13 to remove oil adhering to the discharge port face 13.

When the wiping member 21 further moves in the A direction, the wiping member 21 separates from the discharge port face 13 (process e). Advantageously, the liquid discharge apparatus 1 includes a cleaner 4 for removing dirt adhering to the wiping member 21. If the liquid discharge apparatus 1 includes the cleaner 4, the wiping member 21 further moves in the A direction to come into contact with the cleaner 4. Then, dirt adhering to the wiping member 21 are removed (process f). Advantageously, when the wiring member 21 comes into contact with the cleaner 4 and then moves in the B direction, the wiping member 21 wipes the discharge port face 13. The cleaner 4 may be anything as long as it can remove dirt adhering to the wiping member 21. For example, the cleaner 4 may be a cloth for wiping the wiping member 21.

As described above, by employing separate members for the application member 22 for applying oil to the sealing material 8 and the wiping member 21 for wiping the discharge port face 13, it becomes possible to prevent defective printing due to the oil adhesion to the discharge port face 13 while reducing the abrasion of the sealing material 8 by the application member 22.

(Oil)

The oil according to the present exemplary embodiment will be described below. The oil according to the present exemplary embodiment reduces the friction coefficient between the wiping member 21 and the sealing material 8. Advantageously, the oil is an oily resin made of straight-chain polymer. More specifically, silicone-based oils, polyglycol-based oils, and ester-based oils are desirable.

Silicone-based oils according to the present exemplary embodiment refer to oily resins having a siloxane bond as the main frame. Specific examples of silicone-based oils include dimethyl silicone oils, and denatured silicone oils in which various organic groups are introduced to a part of methyl groups in molecules, such as alkyl denatured silicone oil, fluorine denatured silicone oil, polyether denatured silicone oil, alcohol denatured silicone oil, amino denatured silicone oil, epoxy denatured silicone oil, epoxy polyether denatured silicone oil, phenol denatured silicone oil, carboxy denatured silicone oil, mercapto denatured silicone oil, amide denatured silicone oil, carbana denatured silicone oil, and higher fatty acid denatured silicone oil. Specific examples of silicone oils include KF-96-10CS, KF-96-300CS (Shin-Etsu Chemical Co., Ltd.) and DOWSIL BY 16-846 Fluid (Dow Toray Co., Ltd.).

Polyglycol-based oils according to the present disclosure refer to polyalkylene glycol. Specific examples of polyglycol-based oils include PEG400, PEG600 and PEG1000 (SANYO CHEMICAL INDUSTRIES, LTD.).

Examples of ester-based oils according to the present disclosure include polyol ester oil, complex ester oil, and polyol carbonate ester oil. Examples of desirable polyol ester oils include esters of hindered alcohols. Examples of esters include trimethylol propane tripelargonate, pentaerythritol 2-ethyl hexanoate, and pentaerythritol tetrapelargonate. Examples of hindered alcohols include neopentyl glycol, trimethylol ethane, trimethylol propane, trimethylol butane, and pentaerythritol. Examples of applicable products include the Uni-star M series and H series (NOF CORPORATION).

In particular, the use of silicone oil or polyglycol oil is desirable. Silicone-based and polyglycol-based oils can be advantageously used due to the high affinity with the wiping member 21 (described below) achieving lower friction.

Advantageously, the weight-average molecular weight of oil is 1,000 or more and 100,000 or less. If the weight-average molecular weight is within this range, oil is hardly volatilized and maintains fluidity, making it possible to effectively exhibit low abrasion. One type of oil, or a combination of two or more types of oil may be used.

(Wiping Member and Application Member)

The wiping member 21 and the application member 22 will be described below. The rubber hardness of the wiping member 21 according to the present exemplary embodiment is preferably 30 degrees and is more preferably 40 degrees or less according to Japanese Industrial Standard (JIS) so that the wiping member 21 can efficiently clean the discharge port face 13. From the viewpoint of reducing the possibility that the sealing material 8 is worn while the wiping member 21 is in contact with the sealing material 8, the rubber hardness of the wiping member 21 is preferably 80 degrees or less and is more preferably 70 degrees or less according to JIS. Also, to reduce the possibility that the sealing material 8 is worn while the application member 22 is supplying oil to the sealing material 8, the rubber hardness of the application member 22 is preferably 80 degrees or less and is more preferably 70 degrees or less according to JIS.

Since the application member 22 according to the present exemplary embodiment is intended to apply oil to the sealing material 8, advantageously, oil is easily delivered from the oil supply unit and is easy to be retained. Therefore, the contact angle of oil with respect to the application member 22 is advantageously 60 degrees or less and is more advantageously 40 degrees or less. On the other hand, advantageously, oil does not adhere to the wiping member 21. Therefore, advantageously, the contact angle of oil with respect to the wiping member 21 is 50 degrees or more. The contact angle of oil according to the present exemplary embodiment refers to the dynamic receding contact angle of oil.

Examples of applicable materials of the wiping member 21 and the application member 22 include ether-based urethanes, butyl rubber-based hydrogenated nitrile rubbers, and polypropylene. More desirable materials include ether-based urethanes and butylene rubber-based hydrogenated nitrile rubbers because these materials are not denatured by the oil adhesion and less likely to leave scratch marks on the sealing material 8. Particularly from the viewpoint of wettability, a material containing butyl rubber-based hydrogenated nitrile rubbers is suitably used. Advantageously, the material contains an ether-based urethane or a butyl rubber-based hydrogenated nitrile rubber. Particularly from the viewpoint of wettability, it is more desirable that the material contains a butyl rubber-based hydrogenated nitrile rubber.

(Sealing Material)

The sealing material 8 according to the present exemplary embodiment will be described below. Advantageously, the sealing material 8 is likely to retain oil applied from the application member 22. More specifically, it is desirable that the contact angle of oil with respect to the sealing material 8 is 55 degrees or less.

Further, advantageously, the sealing material 8 easily receives oil from the application member 22. More specifically, it is desirable that oil is easily delivered to the sealing material 8 than to the application member 22. This allows oil to be efficiently delivered from the application member 22 to the sealing material 8, reducing the possibility that the sealing material 8 is worn by the wiping member 21. More specifically, it is desirable that the contact angle of oil with respect to the sealing material 8 is at least 10 degrees smaller than the contact angle of oil with respect to the application member 22.

Likewise, advantageously, the wiping member 21 is less likely to receive oil from the sealing material 8. More specifically, it is desirable that the sealing material 8 is more likely to retain oil than the wiping member 21. Further, it is desirable that the contact angle of oil with respect to the sealing material 8 is at least 10 degrees smaller than the contact angle of oil with respect to the wiping member 21.

From the viewpoint of the sealing performance, formability, and productivity, it is desirable that the sealing material 8 according to the present exemplary embodiment contains an epoxy resin composition. Particularly from the viewpoint of the adhesiveness of the sealing material 8 to the substrates 2 and the member 12, it is more desirable that the sealing material 8 contains an anion polymerization-based epoxy resin composition.

The sealing material 8 containing a silica filler in its composition enables improving the wettability and the low friction property due to the surface unevenness of the sealing material 8. The type of the silica filler is not particularly limited. From the viewpoint of preventing the increase in viscosity of the sealing material 8, it is desirable that the particle diameter is 0.1 μm or more and 100 μm or less. The particle diameter indicates a volume cumulative particle diameter D50 measured by a laser diffraction scattering particle size distribution measuring apparatus. From the viewpoint of improving the affinity with other materials, the use of a silane-treated silica filler is desirable. Advantageously, the composition of the sealing material 8 contains the silica filler by 40% by weight or more. As described above, to tightly fill the gap with the filler, it is desirable that the epoxy resin is in a liquid state at room temperature. Specific examples of epoxy resins include the hydrogenated epoxy resin series jERYX8000, YX8000D, YX8034, and YX8040 (Mitsubishi Chemical Group Corporation).

To improve compatibility between the filler and the epoxy resin, it is desirable to add a silane agent to the sealing material 8. In particular, the use of a silane agent with a low molecular weight is desirable. More specifically, the molecular weight of the silane agent is desirably 500 or less and is more desirably 300 or less.

EXAMPLES

Examples related to the wiping member 21, the application member 22, oil, and the sealing material 8, which are characteristic configurations according to the present exemplary embodiment, will be described below. The following materials are used as the components described by product names in the following examples and comparative examples.

JER YX8000 (Mitsubishi Chemical Group Corporation): hydrogenated bisphenol A epoxy resin PEPT (SC ORGANIC CHEMICAL CO., LTD.): Ether type trifunctional thiol PN40J (Ajinomoto Fine-Techno Co., Inc.): Epoxyamine adduct FB-5D (Denka Company Limited.): Fused silica filler SO-E2 (Admatechs): Surface processing silica filler AEROSIL200 (NIPPON AEROSIL CO., LTD.): Fused silica filler A-186 (Momentive Performance Materials Inc.): Alicyclic epoxy-based silane agent KF-96-10CS (Shin-Etsu Chemical Co., Ltd.): Silicone oil DOWSIL BY 16-846 Fluid (Dow Toray Co., Ltd.): Silicone oil PEG600 (SANYO CHEMICAL INDUSTRIES, LTD.): Polyglycol oil PEG1000 (SANYO CHEMICAL INDUSTRIES, LTD.): Polyglycol oil Uni-star H310R (NOF CORPORATION): Ester oil

First to Twentieth Examples

The examples will be described below centering only on characteristic configurations and their operations in an example where the first oil supply unit 7 is disposed outside the liquid discharge head 3. We performed the cleaning method illustrated in the flowchart in FIG. 3. As the sealing material 8, compositions made according to the compositions in Table 1 were used. In making the sealing material 8, the materials were kneaded with the compounding ratios illustrated in the compositions in Table 1, and then mixed in vacuum for five minutes at a rate of 600 rpm by using the HIVIS MIX model3 (PRIMIX Corporation). Then, a resin composition for the sealing material 8 was obtained. Then, the resin composition for the sealing material 8 was casted into the portion of the sealing material 8 in FIG. 2C by using a dispenser so that no foam enters the portion. Then, the substrate 2 was left at room temperature for at least a day to cure the composition.

TABLE 1

| | | | Item | | | |
|---|---|---|---|---|---|---|
| | | Product name | Sealing material A | Sealing material B | Sealing material C | Sealing material D |
| Base resin (part) | Epoxy resin | JER YX8000 | 100 | 100 | 100 | 100 |
| Curing agent (part) | Polythiol | PEPT | 60 | 60 | 60 | 60 |
| Curing catalyst (part) | Solid basic Compound | PN40J | 10 | 10 | 10 | 10 |
| Silica filler (part) | | FB-5D | 300 | 100 | 0 | 0 |
| | | SO-E2 | 0 | 0 | 300 | 0 |
| | | AEROSIL200 | 0 | 0 | 0 | 300 |
| Silane agent (part) | | A-186 | 50 | 50 | 50 | 50 |

As illustrated in FIG. 4, the application member 22 was mechanically moved in the horizontal and vertical directions to apply oil from the application member 22 to the sealing material 8. The application member 22 having a different rubber hardness was used in each example. Further, the application member 22 having a different contact angle of the oil was used in each example. As the contact angle, the dynamic receding contact angle of the oil with respect to the application member 22 was measured.

Finally, as illustrated in FIG. 5, the discharge port face 13 was wiped by mechanically moving the wiping member 21. The sliding speed of the wiping member 21 in the wiping process was 80 mm/sec, and the amount of incursion to the discharge port face 13 was 1.5 mm. The wiping member 21 having a different rubber hardness was used in each example. Further, the wiping member 21 having a different contact angle of the oil with respect to the wiping member 21 was used in each example.

Evaluation Method

To evaluate the cleaning of the discharge port face 13 of the liquid discharge head 3, we repeated the above-described series of operations 1,500 times, and then observed a damage on the sealing material 8 and the ink adhesion to the discharge port face 13 by using an optical microscope. The following evaluation criteria were used:

Damage on the sealing material 8

A: No damage on the sealing material 8 was observed.

B: Damage on the sealing material 8 with an undistinguishable level was observed.

C: Damage on the sealing material 8 with a distinguishable level was observed.

Ink adhesion to the discharge port face 13

A: No ink adhesion was observed.

B: Ink adhesion with an undistinguishable level was partly observed.

C: Ink adhesion with a distinguishable level was observed in the entire region.

Then, we evaluated the liquid discharge head 3 after the cleaning. We evaluated the print quality by visually observing streaks, white spots, and defective liquid jet in a 5% chart solid portion. Print patterns were printed with the 100% duty ratio for each ink in a chart with the 5% print area for each color out of the entire paper area. Print conditions include a recording density of 1,200 dots per inch (dpi) and one-pass printing.

Print quality

A: No white spots, streaks, or defective ink jet were observed in the solid portion.

B: Streaks and defective ink jet were observed but no white spots were observed in the solid portion.

C: White spots, streaks, and defective ink jet were partly or entirely observed in the solid portion.

First Comparative Example

According to a first comparative example, we performed only the wiping process for wiping the sealing material 8 by using the wiping member 21 without performing the oil application process for the sealing material 8. Other conditions were similar to those according to the first to the twentieth exemplary embodiments.

Evaluation Results

Evaluation results of the exemplary embodiments and comparative examples are illustrated in Tables 2 to 4.

TABLE 2

| | | First example | Second example | Third example | Fourth example |
|---|---|---|---|---|---|
| Application member | Material | Hydrogenated nitrile rubber | Hydrogenated nitrile rubber | Hydrogenated nitrile rubber | Hydrogenated nitrile rubber |
| | Rubber hardness [deg.] | 70 | 70 | 70 | 70 |
| | Contact angle [deg.] | 40 | 40 | 40 | 40 |

TABLE 2-continued

| | | | | | |
|---|---|---|---|---|---|
| Wiping member | Material | Hydrogenated nitrile rubber | Urethane | Polypropylene | Hydrogenated nitrile rubber |
| | Rubber hardness [deg.] | 70 | 70 | 70 | 80 |
| | Contact angle [deg.] | 40 | 40 | 40 | 40 |
| | Amount of oil supply [g] | 0.8 | 0.8 | 0.8 | 0.8 |
| Oil | Product name | KF-96-10CS | KF-96-10CS | KF-96-10CS | KF-96-10CS |
| Sealing material | Sealing material name | Sealing material A | Sealing material A | Sealing material A | Sealing material A |
| | Contact angle [deg.] | 20 | 20 | 20 | 20 |
| | Amount of oil application [g] | 0.5 | 0.5 | 0.5 | 0.5 |
| Damage on sealing material | | A | A | B | B |
| Ink adhesion to discharge port face | | A | A | B | A |
| Print quality | | A | A | B | B |

| | | Fifth example | Sixth example | Seventh example |
|---|---|---|---|---|
| Application member | Material | Hydrogenated nitrile rubber | Hydrogenated nitrile rubber | Hydrogenated nitrile rubber |
| | Rubber hardness [deg.] | 70 | 70 | 70 |
| | Contact angle [deg.] | 40 | 40 | 40 |
| Wiping member | Material | Hydrogenated nitrile rubber | Hydrogenated nitrile rubber | Hydrogenated nitrile rubber |
| | Rubber hardness [deg.] | 70 | 70 | 70 |
| | Contact angle [deg.] | 40 | 40 | 40 |
| | Amount of oil supply [g] | 0.8 | 0.8 | 0.8 |
| Oil | Product name | DOWSIL BY 16-846 Fluid | PEG600 | PEG1000 |
| Sealing material | Sealing material name | Sealing material A | Sealing material A | Sealing material A |
| | Contact angle [deg.] | 20 | 20 | 20 |
| | Amount of oil application [g] | 0.5 | 0.5 | 0.5 |
| Damage on sealing material | | A | A | A |
| Ink adhesion to discharge port face | | A | A | A |
| Print quality | | A | A | A |

TABLE 3

| | | Eighth example | Ninth example | Tenth example | Eleventh example |
|---|---|---|---|---|---|
| Application member | Material | Hydrogenated nitrile rubber | Hydrogenated nitrile rubber | Hydrogenated nitrile rubber | Hydrogenated nitrile rubber |
| | Rubber hardness [deg.] | 70 | 70 | 70 | 70 |
| | Contact angle [deg.] | 40 | 40 | 40 | 40 |
| Wiping member | Material | Hydrogenated nitrile rubber | Hydrogenated nitrile rubber | Hydrogenated nitrile rubber | Hydrogenated nitrile rubber |
| | Rubber hardness [deg.] | 70 | 70 | 70 | 70 |
| | Contact angle [deg.] | 40 | 50 | 60 | 60 |
| | Amount of oil supply [g] | 0.8 | 0.7 | 0.4 | 0.4 |
| Oil | Product name | Uni-star H310R | KF-96-10CS | KF-96-10CS | KF-96-10CS |

TABLE 3-continued

| | | | | | |
|---|---|---|---|---|---|
| Sealing material | Sealing material name | Sealing material A | Sealing material A | Sealing material A | Sealing material B |
| | Contact angle [deg.] | 20 | 20 | 20 | 55 |
| | Amount of oil application [g] | 0.5 | 0.5 | 0.2 | 0.05 |
| Damage on sealing material | | B | A | B | B |
| Ink adhesion to discharge port face | | A | A | A | A |
| Print quality | | B | A | B | B |

| | | Twelfth example | Thirteenth example | Fourteenth example |
|---|---|---|---|---|
| Application member | Material | Hydrogenated nitrile rubber | Hydrogenated nitrile rubber | Hydrogenated nitrile rubber |
| | Rubber hardness [deg.] | 70 | 70 | 70 |
| | Contact angle [deg.] | 40 | 40 | 40 |
| Wiping member | Material | Hydrogenated nitrile rubber | Hydrogenated nitrile rubber | Hydrogenated nitrile rubber |
| | Rubber hardness [deg.] | 70 | 70 | 70 |
| | Contact angle [deg.] | 40 | 40 | 70 |
| | Amount of oil supply [g] | 0.8 | 0.8 | 0.3 |
| Oil | Product name | KF-96-10CS | KF-96-10CS | KF-96-10CS |
| Sealing material | Sealing material name | Sealing material C | Sealing material D | Sealing material A |
| | Contact angle [deg.] | 15 | 30 | 20 |
| | Amount of oil application [g] | 0.6 | 0.4 | 0.2 |
| Damage on sealing material | | A | B | B |
| Ink adhesion to discharge port face | | A | A | A |
| Print quality | | A | B | B |

TABLE 4

| | | Fifteenth example | Sixteenth example | Seventeenth example | Eighteenth example |
|---|---|---|---|---|---|
| Application member | Material | Hydrogenated nitrile rubber | Hydrogenated nitrile rubber | Hydrogenated nitrile rubber | Hydrogenated nitrile rubber |
| | Rubber hardness [deg.] | 70 | 30 | 40 | 70 |
| | Contact angle [deg.] | 40 | 40 | 40 | 40 |
| Wiping member | Material | Hydrogenated nitrile rubber | Hydrogenated nitrile rubber | Hydrogenated nitrile rubber | Hydrogenated nitrile rubber |
| | Rubber hardness [deg.] | 90 | 70 | 70 | 70 |
| | Contact angle [deg.] | 40 | 40 | 40 | 40 |
| | Amount of oil supply [g] | 0.8 | 0.8 | 0.8 | 0.8 |
| Oil | Product name | KF-96-10CS | KF-96-10CS | KF-96-10CS | KF-96-10CS |
| Sealing material | Sealing material name | Sealing material A | Sealing material A | Sealing material A | Sealing material A |
| | Contact angle [deg.] | 20 | 20 | 20 | 20 |
| | Amount of oil application [g] | 0.5 | 0.5 | 0.5 | 0.5 |
| Damage on sealing material | | B | A | A | A |
| Ink adhesion to discharge port face | | A | B | A | A |
| Print quality | | B | B | A | A |

TABLE 4-continued

| | | Nineteenth example | Twentieth example | First comparative example |
|---|---|---|---|---|
| Application member | Material | Hydrogenated nitrile rubber | Hydrogenated nitrile rubber | Hydrogenated nitrile rubber |
| | Rubber hardness [deg.] | 80 | 80 | 70 |
| | Contact angle [deg.] | 40 | 20 | 40 |
| Wiping member | Material | Hydrogenated nitrile rubber | Hydrogenated nitrile rubber | None |
| | Rubber hardness [deg.] | 70 | 70 | |
| | Contact angle [deg.] | 40 | 40 | |
| | Amount of oil supply [g] | 0.8 | 0.8 | |
| Oil | Product name | KF-96-10CS | KF-96-10CS | |
| Sealing material | Sealing material name | Sealing material A | Sealing material A | Sealing material A |
| | Contact angle [deg.] | 20 | 20 | 20 |
| | Amount of oil application [g] | 0.5 | 0.5 | None |
| Damage on sealing material | | B | A | C |
| Ink adhesion to discharge port face | | A | B | A |
| Print quality | | B | B | C |

According to the first to the twentieth examples, high print quality was obtained because the application member 22 for applying oil to the sealing material 8 and the wiping member 21 for wiping the discharge port face 13 were different members.

On the other hand, according to the first comparative example, the oil application process for the sealing material 8 was not performed, and hence the sealing material 8 was entirely damaged during the wiping of the discharge port face 13 of the wiping member 21. As a result, the print quality largely decreased.

As described above, by employing separate members for the application member 22 for applying oil to the sealing material 8 and the wiping member 21 for wiping the discharge port face 13, it becomes possible to prevent defective printing while reducing the abrasion of the sealing material 8 by the wiping member 21.

The present disclosure is directed to providing a liquid discharge apparatus capable of preventing defective printing while reducing the abrasion of a sealing material by a wiping member, and a method for cleaning a discharge port face of the liquid discharge apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-130033, filed Aug. 9, 2023, and No. 2024-083430, filed May 22, 2024, which are hereby incorporated by reference herein in their entirety.

What is claimed is:

1. A liquid discharge apparatus comprising:

a substrate having a discharge port face provided with a discharge port for discharging a liquid;

a member having a recessed portion for storing the substrate;

a sealing material for sealing a gap between the recessed portion of the member and the substrate;

a wiping member configured to wipe the discharge port face; and an application member, that is separate from the wiping member, wherein the application member directly applies oil to the sealing material.

2. The liquid discharge apparatus according to claim 1, comprising:

an oil supply unit configured to supply oil to the application member; and an oil storage unit configured to store the oil.

3. The liquid discharge apparatus according to claim 1, further comprising a control unit configured to control the wiping member to wipe the discharge port face in a state where the oil is retained by the sealing material.

4. The liquid discharge apparatus according to claim 1, wherein the application member does not apply the oil to the discharge port face.

5. The liquid discharge apparatus according to claim 2, further comprising a liquid discharge head provided with a plurality of the substrates, the member, the sealing material, and the oil supply unit, wherein the oil supply unit is disposed at an edge of the liquid discharge head in an arrangement direction of the plurality of the substrate substrates.

6. The liquid discharge apparatus according to claim 5, further comprising a plurality of the oil supply units, wherein the plurality of the oil supply units is disposed at both edges of the liquid discharge head in the arrangement direction of the plurality of the substrates.

7. The liquid discharge apparatus according to claim 1, wherein a contact angle of the oil with respect to the wiping member is 60 degrees or less.

8. The liquid discharge apparatus according to claim 1, wherein the material of the wiping member contains ether-based urethanes or hydrogenated nitrile rubber.

9. The liquid discharge apparatus according to claim 1, wherein a rubber hardnesses of the wiping member is 30 degrees or more and 80 degrees or less.

10. The liquid discharge apparatus according to claim 1, wherein the contact angle of the oil with respect to the sealing material is 55 degrees or less.

11. The liquid discharge apparatus according to claim 1, wherein the contact angle of the oil with respect to the sealing material is at least 10 degrees smaller than the contact angle of the oil with respect to the application member.

12. A method for cleaning a discharge port face of a liquid discharge apparatus comprising:

a substrate having the discharge port face provided with a discharge port for discharging a liquid;

a member having a recessed portion for storing the substrate;

a sealing material for sealing a gap between the recessed portion of the member and the substrate;

a wiping member configured to wipe the discharge port face; and an application member, that is separate from the wiping member, wherein the application member directly applies oil to the sealing material, wherein the method comprises:

first applying for applying the oil from the application member to the sealing material; and wiping the discharge port face by using the wiping member.

13. The method for cleaning the discharge port face of the liquid discharge apparatus according to claim 12, wherein the first applying is performed before the wiping.

14. The method for cleaning the discharge port face of the liquid discharge apparatus according to claim 12, the method further comprising:

providing a first oil supply unit configured to supply the oil to the application member; and first supplying for supplying the oil from the first oil supply unit to the application member before the first applying.

15. The method for cleaning the discharge port face of the liquid discharge apparatus according to claim 14, the method further comprising:

providing a second oil supply unit configured to supply the oil to the application member; and second supplying for supplying the oil from the second oil supply unit to the application member after the first applying.

16. The method for cleaning the discharge port face of the liquid discharge apparatus according to claim 15, the method further comprising second applying for applying the oil from the application member to the sealing material after the second supplying.

17. The method for cleaning the discharge port face of the liquid discharge apparatus according to claim 15, wherein the discharge port face and the sealing material are disposed between the first and the second oil supply units.

18. The method for cleaning the discharge port face of the liquid discharge apparatus according to claim 15, wherein the oil contains at least one type of silicone-based, polyglycol-based, and ester-based oils.

* * * * *